Feb. 13, 1968   S. K. JENSSEN   3,368,946
FUEL ASSEMBLY
Filed Feb. 25, 1965   4 Sheets-Sheet 1
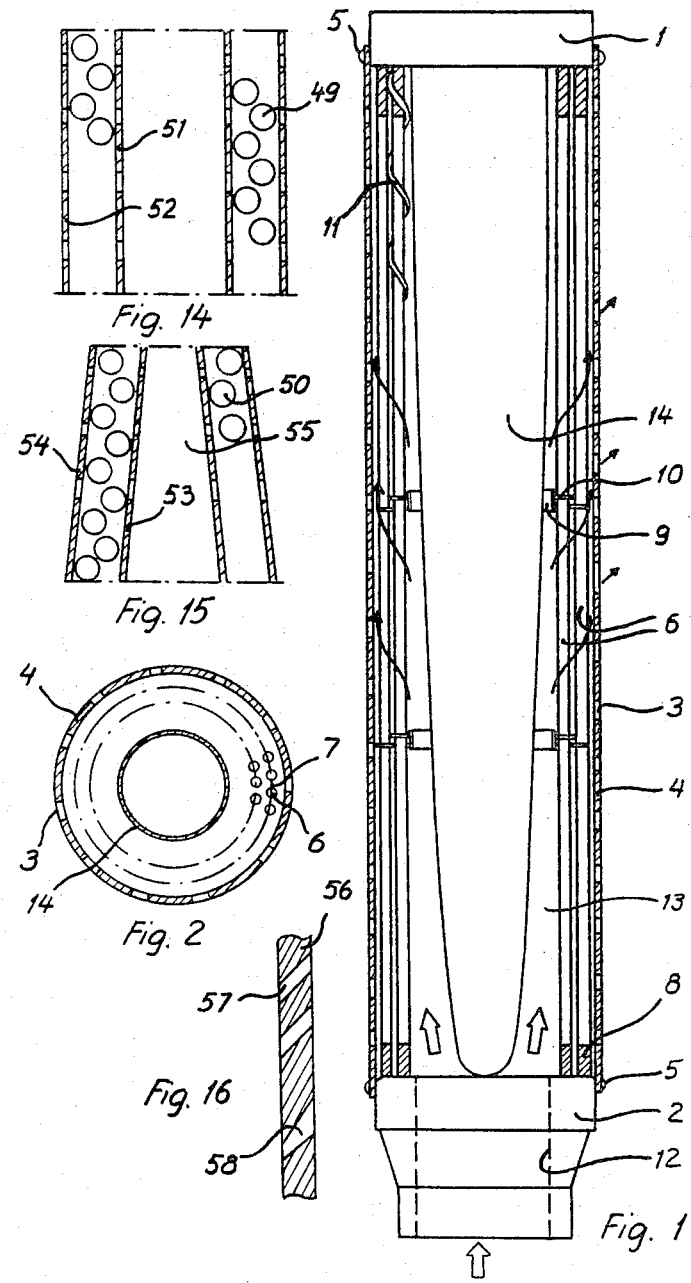
INVENTOR.
Sverre Knut Jenssen
BY
Davis, Hope, Faithfull & Hapgood
ATTORNEYS

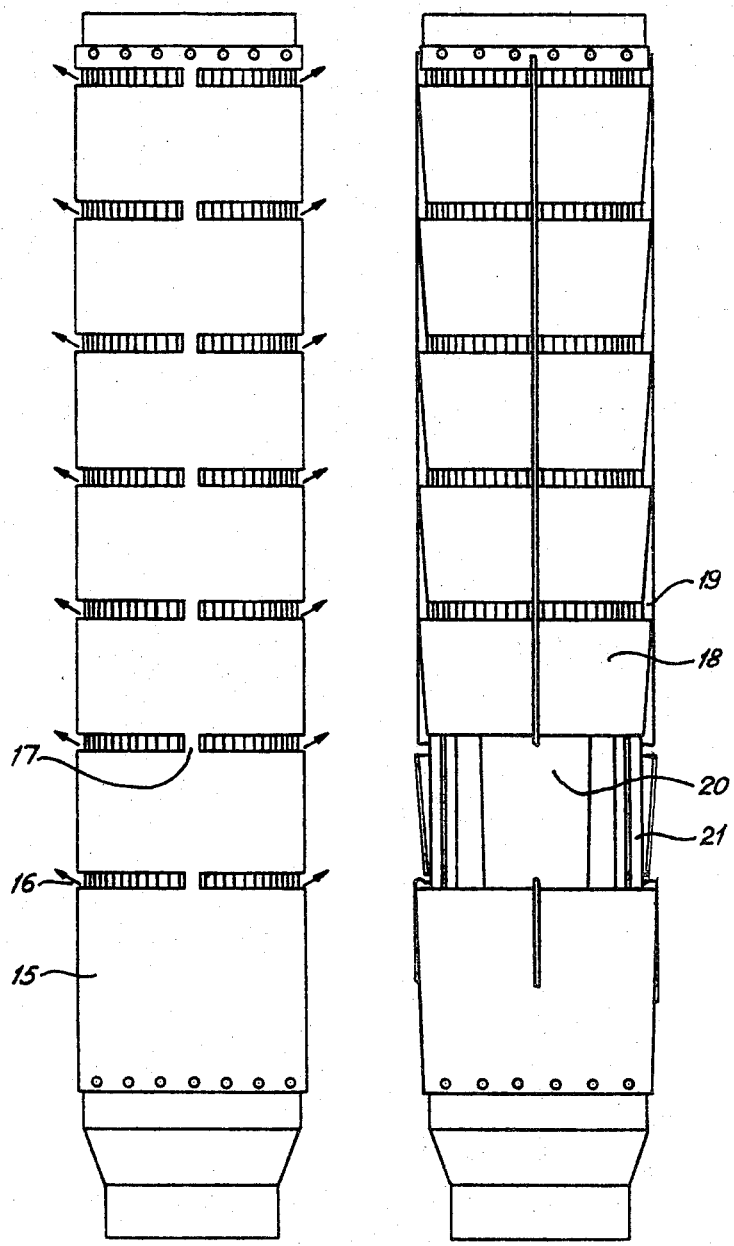

INVENTOR.
Sverre Knut Jenssen

Feb. 13, 1968  S. K. JENSSEN  3,368,946
FUEL ASSEMBLY
Filed Feb. 25, 1965  4 Sheets-Sheet 1
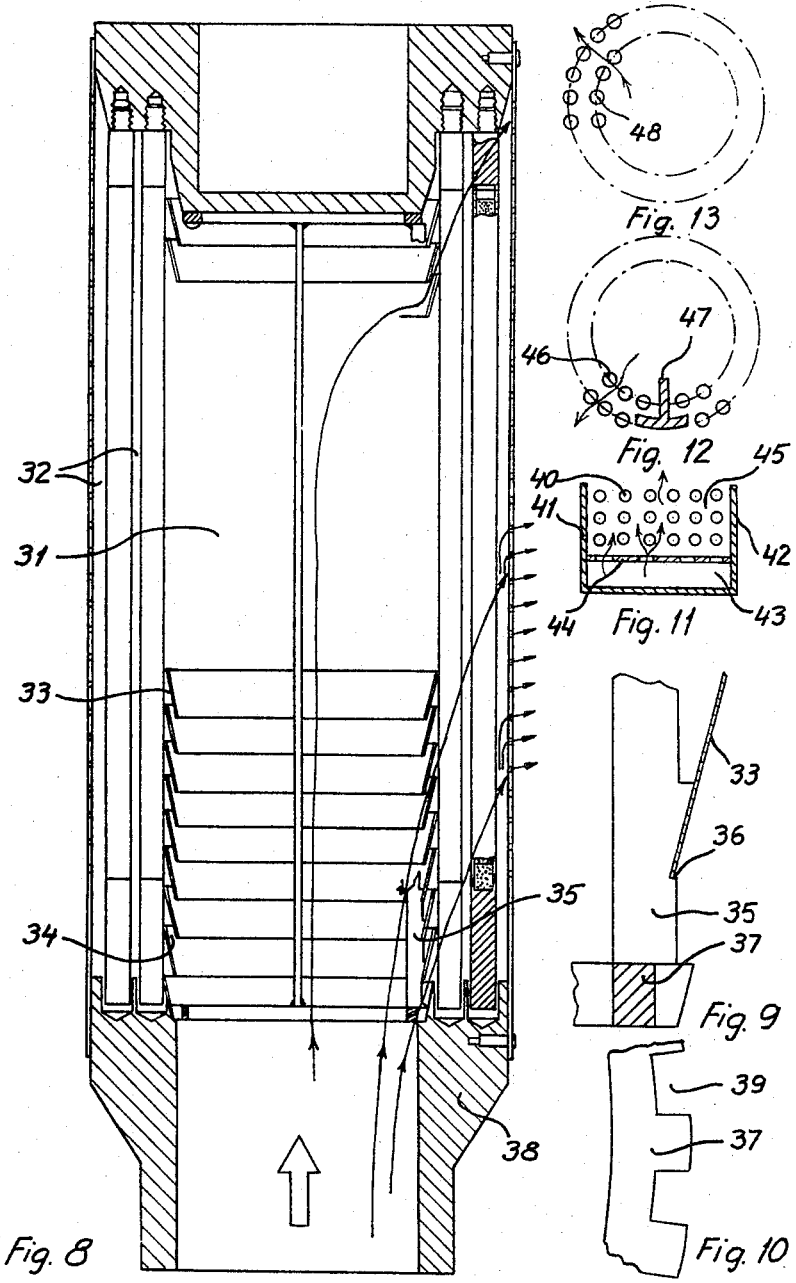
INVENTOR.
Sverre Knut Jenssen
BY
Davis, Hope, Faithfull Hapgood
ATTORNEYS United States Patent Office 3,368,946
Patented Feb. 13, 1968

3,368,946
FUEL ASSEMBLY
Sverre K. Jenssen, Saltsjobaden, Sweden, assignor to Alfa-Laval AB, Tumba, Sweden, a corporation of Sweden
Filed Feb. 25, 1965, Ser. No. 435,216
Claims priority, application Sweden, Mar. 4, 1964, 2,640/64
6 Claims. (Cl. 176—78)

A fuel assembly for a nuclear reactor can be built up in different ways. The fuel, e.g. uranium oxide or any other substance, is usually first shaped into small pellets which are enclosed in a cladding of stainless steel or the like. It is perhaps more usual to pack a number of such cylindric pellets in a stainless steel tube and to seal the ends of the tube so as to obtain fuel rods having a length of several meters, which rods are assembled so as to form bundles of parallel rods by means of end supports to which the rod ends are welded or fastened by engagement in holes in the end supports. The end plugs of the rods are preferably made of an incombustible material.

Owing to the so-called nuclear fission process, the fuel in a nuclear reactor is caused to disintegrate while generating heat. Said heat must be carried off by means of a cooling agent or coolant, e.g. gas, steam or liquid, of which heavy or light water are probably the most used. The coolant is caused to flow around the fuel elements in spaces arranged between them and thereafter discharged to the zone surrounding the fuel assembly where it merges with the so-called moderator water which, by means of a pump, is circulated in a circuit where it is deprived of heat and thereafter reconveyed as coolant to the fuel assembly. The recovered heat is used, for example, for the generation of steam for turbine operation.

Instead of fuel rods, the fuel elements can be formed into cladded balls or cladded bodies of any other shape. The cladding is not necessary but preferable if one wishes to seal in the radioactive fission products.

No matter how the fuel assembly is built up by the fuel units which form the fuel body in said assembly, the fuel body must be efficiently cooled. The fuel body is generally very elongated, mostly with a length of four to five meters, and fitted in a sealed tank filled with coolant. As far as the cooling of the fuel body is concerned, a distinction is made between longitudinal and transverse coolant streams. In the case of a longitudinal coolant stream, the coolant sweeps over the fuel body along its length, which has the drawback that the coolant has to follow a long flow path which may result in much too high a flow velocity and great pressure drop. On the other hand, in the case of a transverse cooling stream, the flow path is short and a given coolant flow rate has often an unsatisfactorily low velocity along the cooling surfaces of the fuel.

In order to avoid a situation in which the coolant temperature in the cooling channels formed by the spacings between the fuel elements rises to too high a value above the inlet temperature or in which vaporization of a liquid coolant occurs to too great an extent, the volume of coolant in the cooling channels must be renewed at a rate which corresponds to the generated heat or power. A certain mass flow of coolant must therefore be maintained. At the same time the velocity of the coolant must be high in order to avoid the burning out of the fuel cladding. On the other hand, the pressure drop in the flow of coolant through the fuel assembly must be as low as possible in power reactors so that the pumping power required for the pressure forced circulation of the coolant does not consume too large a percentage of the total generated power.

The present invention aims at achieving a more efficient cooling of the fuel bodies than has hitherto been possible. The more efficient cooling is obtained by arranging the fuel bodies so as to be passed by a great mass flow of coolant without the pressure drop becoming too great and for which a velocity may be chosen which is suitable for efficient cooling of the fuel while requiring a minimum of pumping power, and this in order to make it possible to considerably increase the power generated by a fuel assembly within the same space. Said more efficient cooling is obtained by a circulation of the coolant in the manner disclosed hereinafter.

During the nuclear fission process, i.e. when the fuel disintegrates and generates heat, the heat generation is at a minimum at the ends of the fuel body and at a maximum between the ends. The aim is to balance the cooling process so that it is as uniform as possible and is adjustable to suit the conditions in every particular case. Neither the exclusively longitudinal flow along the fuel body nor the exclusively transverse flow are, compared to what could be established, satisfactory. According to the invention the cooling flow through the interspace of the fuel body is partly longitudinal and partly transverse, and the longitudinal flow component is, as a rule, greater than the transverse one. This can be achieved by different means and it is possible to determine for every particular case, i.e. for each fuel body, a favourable ratio between the components. According to the invention it is important that the coolant has, along the whole length of the fuel body, a nearly free access for a transverse as well as a longitudinal flow and does not encounter any other obstacles than the fuel elements proper or the means which, according to the invention, determine the ratio between the flow components so that said ratio can be maintained constant along the whole length of the fuel body. It is therefore important that the coolant also can leave the fuel assembly along its whole length.

A particular advantage resulting from the means according to the invention is that if perturbances occur in the feed of coolant to the interspace of the fuel body, e.g. in the case of pump stoppage, the coolant may flow back from the surroundings of the fuel body to the interspace owing to the fact that the interspaces are communicating with the surroundings and the so-called moderator water along the whole length of the fuel assembly for the normal discharge of coolant. The drying out and burn out of the fuel bodies are thus avoided.

The invention is disclosed in some of its embodiments on the attached drawings, the figures of which are more nearly described in the following.

FIG. 1 is a view, partly in longitudinal section, of a fuel assembly with a fuel body constituted by a ring-shaped bundle of rods surrounded by a perforated tube and a filling body fitted inside said bundle.

FIG. 2 is a cross-sectional view across the lower part of the embodiment shown in FIG. 1.

FIGS. 3 and 4 show alternative constructions of the surrounding perforated tube shown in FIG. 1.

FIG. 8 shows, in a shortened form, a longitudinal section through a fuel assembly which, inside the ring-shaped bundle of fuel rods, is provided with guiding means in form of a series of conical collars. FIGS. 9 and 10 are detailed views on a larger scale of the embodiment shown in FIG. 8.

FIGS. 11, 12 and 13 show, in sectional view, alternative constructions of a fuel body built up by fuel rods.

FIGS. 14 and 15 are longitudinal sections through parts of fuel bodies constituted by cladded balls of fuel which are kept assembled by an inner and an outer perforated tube.

Figures 5, 6, 7:
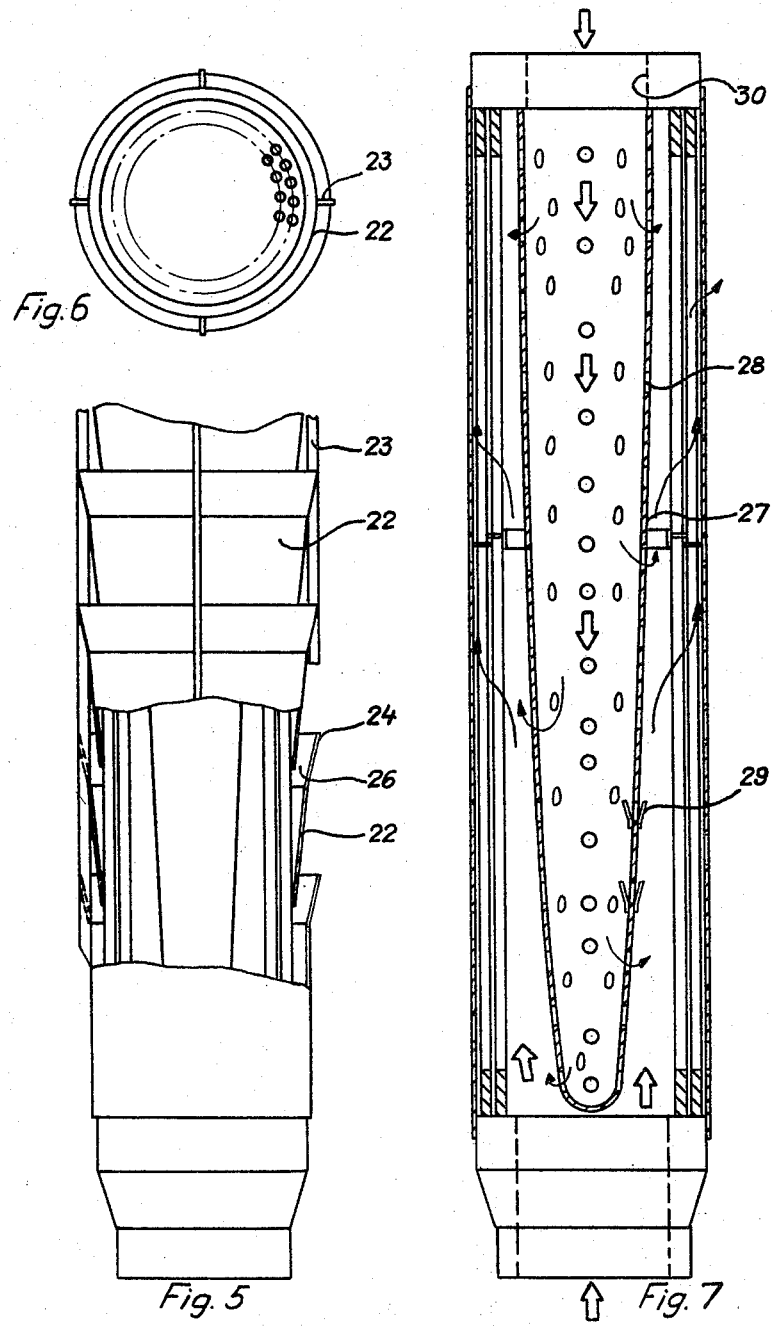
FIG. 5 shows another alternative construction of the surrounding, perforated tube shown in FIG. 1.
FIG. 6 is a view from above of the construction shown in FIG. 5.
FIG. 7 shows, partly in sectional view, a special construction of the fuel assembly shown in FIG. 1 with a perforated filling body.

FIG. 16, finally, is a longitudinal section through an outer or inner perforated tube of a fuel assembly, the perforation of said tube being shown carried out in two different ways.

The fuel assembly according to FIGS. 1 and 2 is constituted by two end supports 1 and 2, which are firmly fastened to a tube 4 provided with perforations 3. The fastening means are constituted by screws 5. The fuel rods 6 are annularly arranged in spaced relationship inside the tube 4, in one or several rows. The ends 8 of the rods are constituted by an incombustible material, preferably the same material as the cladding of the rods, e.g. stainless steel. The rod ends are welded to the end supports 1, 2 or inserted in holes in the end supports or secured to them in a different way. Ring-shaped bracing means 9 with projecting ribs 10 brace the rods in relation to each other. Helical wires 11 around the rods constitute another form of brace to maintain the rods in spaced relationship but may, at the same time, serve as directing means for guiding the coolant through the spacings between the rods. Reference numeral 12 designates the coolant inlet through the end support 2 to the central main channel 13 of the fuel assembly. A filling body 14 is arranged in the main channel 13, which filling body has a paraboloid shape, the object of which is to impart to the coolant flow an as constant as possible velocity in the longitudinal direction of the main channel 13, which body is firmly secured to the end support 1. The coolant will, along the whole length of the fuel assembly, diverge from the main channel in oblique, outwardly directed streams to the surroundings and will cool, as evenly as possible, the cooling surfaces of the rods, this being obtained by the guiding means for coolant, which, in the present case, consist of the filling body 14 and the location which has been given to the perforations 3 of the tube 4. In order to contribute to a constant velocity of the coolant in the main channel 13, the area of the perforations may decrease gradually from the inlet end of the main channel towards the opposite end or also the total area of the perforations per unit of area of the tube may decrease from the inlet end to the opposite end.

The fuel assembly according to FIG. 3 consists, unlike the assembly in FIGS. 1 and 2, of a perforated tube 15, the perforations of which are constituted by transverse slots 16. The slots stretch, however, not around the whole periphery of the tube but leave connecting elements 17 at a couple of places of the periphery so that the tube forms a continuous and coherent unit. The width, length and number of the slots may vary as well as the interval between them.

The fuel assembly according to FIG. 4 consists, unlike the assembly shown in FIG. 3, of a perforated tube built up by a series of conical, tubular sections 18 which are connected to each other by longitudinal braces 19. Reference numeral 20 designates the filling body and 21 the fuel rods. The conical tubes 18 makes it possible to obtain a uniform velocity of the coolant in the chamber between the fuel rods and the inside of the conical tube at the outflow of the coolant through the slot between two adjacent tubular sections, so that the need of a large number of such outflow slots is reduced.

The fuel assembly according to FIGS. 5 and 6 consists, unlike the assembly shown in FIG. 4, of a perforated tube built up by a series of conical tubular sections 22 engaging each other in spaced relationship and assembled by longitudinal braces 23. Each tubular section 22 at its end of larger diameter is provided with a splay 24 so that a slot 26, in the form of a nozzle with an outwardly increasing cross area, is formed between the tubular sections. With such a nozzle or diffusor it is possible to recover a part of the outflow energy of the coolant stream. The distribution of the coolant flow along the length of the fuel assembly can in this case be achieved by differently located diffusors which ensure the recovery at various rates of the velocity head.

The fuel assembly according to FIG. 7 is built up in the same way as the fuel assembly shown in FIG. 1 but in FIG. 7 the filling body 27 is constructed differently. The filling body is thus hollow and its casing is provided with perforations 28 which are provided with deflecting strips 29 and the hollow cavity is further provided with an inlet 30 for the coolant. The deflector strips 29 may be directed in various directions in order to influence the flow direction of the coolant flowing through the main channel by means of the coolant coming through the holes 28 with which it mixes and is discharged through the fuel body.

A condition for a minimum of influence on the coolant flow from below by the coolant flow from above is that the flow from above through the perforations of the filling body is directed upwards by means of deflecting strips 29 at each perforation, which strips may be located as well inside as outside the perforations.

In that latter case the means for guiding the coolant are constituted by the filling body with each perforation and the deflector strips.

In the fuel assembly according to FIGS. 8, 9 and 10, the guidance of the coolant through the spacings between the rods is effected by directing means between the main channel 31 and the spacings 32, such means being in the form of a series of a short conical collets 33 engaging each other in spaced relationship, which collets between them form slots 34. The collets 33 are internally supported by longitudinal braces 35 provided with shoulders 36, whereby the collets rest on said shoulders 36 to which they may be welded in order to form a coherent unit. Said unit rests on a ring 37 which rests on the lower end support 38 of the fuel assembly and is, at its periphery, provided with recesses 39 which give passage to a part of the coolant flow to the spacings between the rods at their lower ends.

The fuel assembly in FIG. 11 consists of a bundle of rods 40 arranged in a rectangular pattern, which rods are arranged between two side walls 41 and 42, said bundle being provided with a main channel 43 extending outside the rods and along their longitudinal direction. Channel 43 communicates with the interspace 45 of the bundle of rods by means of a perforated wall 44. Another perforated wall, not shown, may be fitted in front of the wall 44 and outside the bundle.

The fuel assembly according to FIG. 12 consists of a bundle of fuel rods 46 arranged in a circular pattern, which is completed by a supporting member 47 which connects the end supports of the fuel rods.

The fuel assembly according to FIG. 13 consists of a bundle of fuel rods 48 arranged in a circular pattern, which rods are located on two concentric circles.

The fuel assemblies shown in FIGS. 14 and 15 are constituted by cladded balls 49 and 50, respectively, which, in FIG. 14, are kept assembled by two cylindrical, concentric, perforated tubes 51 and 52, and in FIG. 15 by two concentric, conical, perforated tubes 53 and 54. Owing to the conical shape of the main channel 55 in FIG. 15, the filling body is not required in that embodiment. The balls 49 and 50 should not be located close to each other but kept apart by suitable supporting means not shown.

FIG. 16 shows how it is possible to arrange oblique through-flow channels for the coolant in an outer or inner perforated plate 56, which through-flow channels may have a constant area, as the channel 57, or an area which widens out towards the outlet, as the channel 58.

The invention is not limited to the embodiments shown

I claim:

1. In a nuclear reactor fuel assembly having a plurality of fuel elements spaced from each other and forming an elongated fuel body substantially in the shape of a cylinder, said elements being disposed around an internal channel extending axially of the cylinder and which has at one end an inlet for a cooling agent, the spaces between said elements accommodating flow of cooling agent from said channel to the region outside the cylindrical fuel body, the combination with said fuel elements of a casing in said channel forming a filling member which provides the channel with a throughflow area that decreases gradually from said inlet end toward the other end of the channel, said casing having an inlet for a cooling agent and having perforations forming outlets for flow of cooling agent from the casing into said channel, and means on the casing adjacent said perforations for directing streams of cooling agent from the casing into coaction with cooling agent streams in said channel to effect flow through said spaces in directions having a first component parallel to the longitudinal direction of the fuel body and a second component perpendicular to said longitudinal direction, said second component being smaller than the first component, and the ratio of the magnitudes of said components being substantially constant throughout said spaces.

2. The combination according to claim 1, in which said fuel elements are substantially parallel rods disposed in a bundle having an annular cross section and which surrounds said channel, the combination comprising also two end supports secured to the opposite ends of the rods to hold them in said bundle, one of the end supports forming said inlet at said one end of the channel.

3. The combination according to claim 2, in which the perforated casing is secured to the other of said end supports, said other end support having a passage opening into said inlet of the casing.

4. The combination according to claim 1, in which said directing means on the casing are deflecting strips.

5. The combination according to claim 1, in which said casing has a parabolic form along a longitudinal section.

6. In a nuclear reactor fuel assembly having a plurality of fuel elements spaced from each other and forming an elongated fuel body in which the spaces between said elements extend from one end of said elongated body to the other end, said spaces communicating along the entire length of said body with a main channel for a cooling agent extending along said length and also with an opposed region at the opposite side of the body from said channel, whereby cooling agent from the channel may pass through said spaces and be discharged to said opposed region, the combination with said fuel elements of means for guiding the cooling agent through said spaces in flow directions having a first component parallel to the longitudinal direction of the fuel body and a second component perpendicular to said longitudinal direction, said second component being smaller than the first component, and the ratio of the magnitudes of said components being substantially constant throughout said spaces, said fuel elements being parallel rods disposed in a bundle having an annular cross-section and which surrounds said main channel, the combination comprising also end supports secured to the ends of the rods to hold them in said bundle, one of said end supports forming an inlet for supplying a cooling agent to said main channel, said guiding means including a filling member in the form of a perforated casing disposed in the channel and secured to the other of said end supports, the filling member providing the channel with a throughflow area which decreases gradually from said inlet toward said other end support, said other end support having an inlet leading to the interior of said casing for supplying cooling agent thereto, the perforations of the casing forming outlets from the interior of the casing to said channel, and deflecting strips on the casing adjacent said perforations for directing streams of cooling agent from the casing into coaction with cooling agent streams in the channel to effect flow through said spaces in said flow directions.

References Cited

UNITED STATES PATENTS

| 3,137,637 | 6/1964 | Elliott | 176—83 X |
| 3,177,123 | 4/1965 | Huet | 176—83 |
| 3,179,570 | 4/1965 | Le Foll | 176—59 |
| 3,205,147 | 9/1965 | Foure | 176—61 |
| 3,227,622 | 1/1966 | White | 176—73 |

FOREIGN PATENTS

| 850,021 | 9/1960 | Great Britain. |
| 930,070 | 6/1963 | Great Britain. |

CARL D. QUARFORTH, *Primary Examiner.*

BENJAMIN R. PADGETT, *Examiner.*

A. J. STEINER, *Assistant Examiner.*